Sept. 16, 1958
D. M. YOUNG ET AL
2,852,104
BRAKE HEAD MOUNTING ARRANGEMENT
Filed Feb. 23, 1955
2 Sheets-Sheet 1
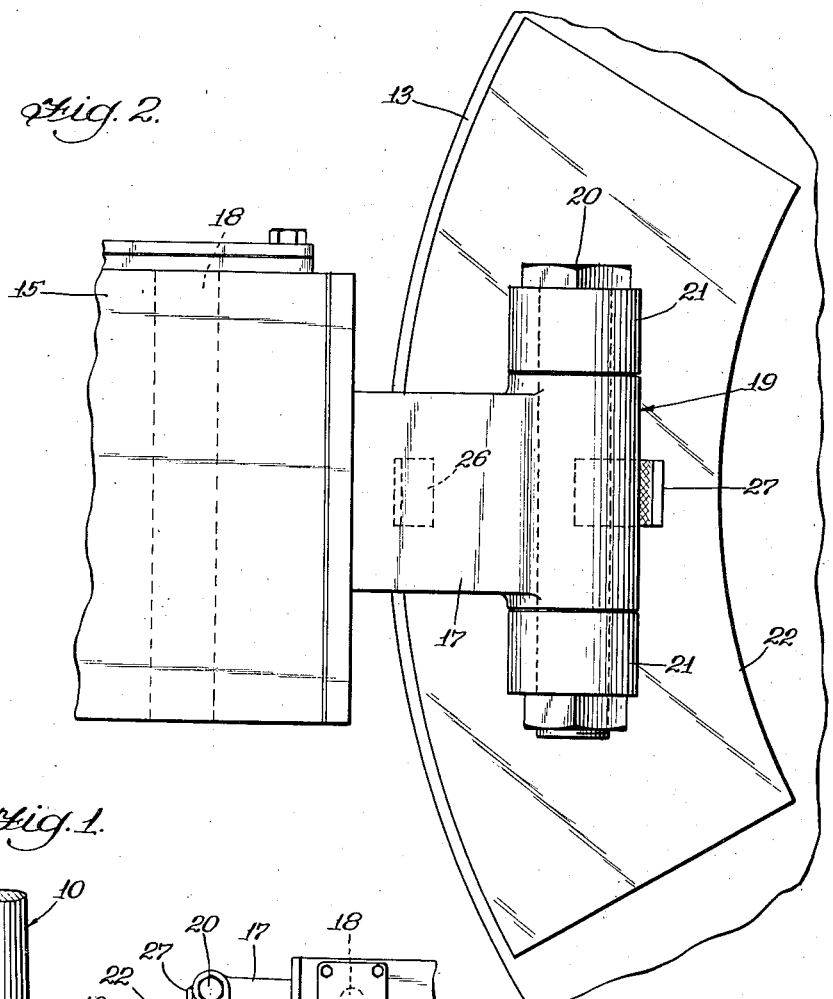
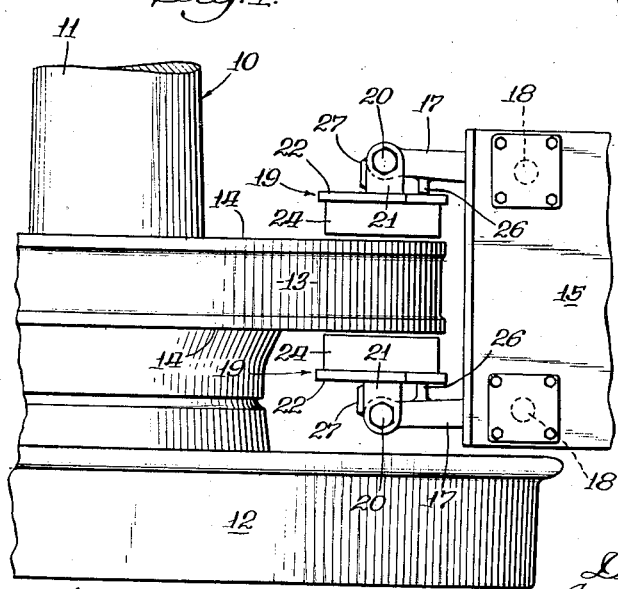
INVENTORS.
Donald M. Young
Joseph E. Klausner
BY Walter L. Schlegel, Jr. Atty
Witness:
Ralph Faust Sept. 16, 1958  D. M. YOUNG ET AL  2,852,104
BRAKE HEAD MOUNTING ARRANGEMENT
Filed Feb. 23, 1955  2 Sheets-Sheet 2
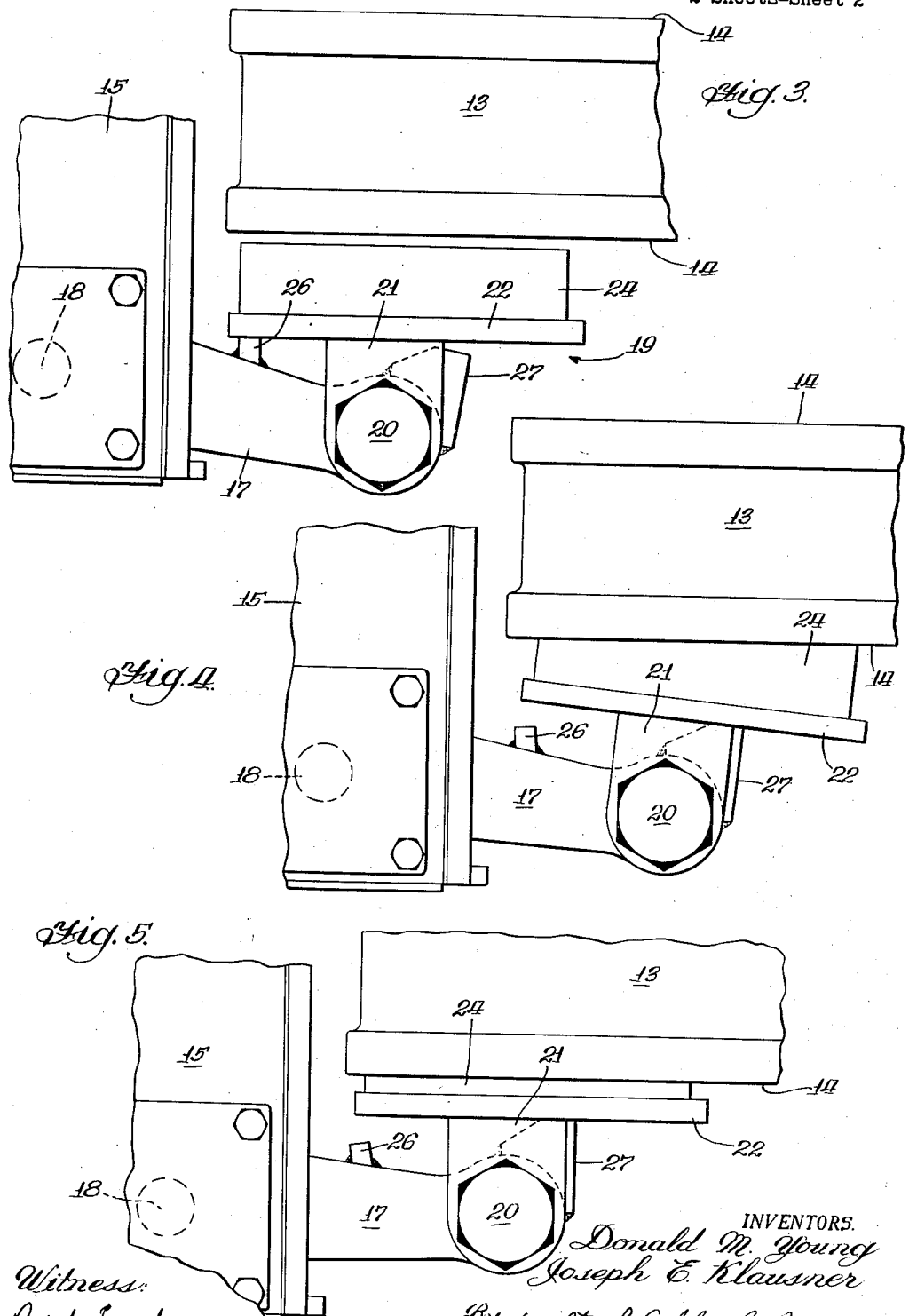
INVENTORS.
Donald M. Young
Joseph E. Klausner
By Walter L. Schlegel, Jr.
Atty.
Witness:
Ralph Faust

United States Patent Office 2,852,104
Patented Sept. 16, 1958

2,852,104

BRAKE HEAD MOUNTING ARRANGEMENT

Donald M. Young, Chicago, Ill., and Joseph E. Klausner, Overland, Mo., assignors to American Steel Foundries, Chicago, Ill., a corporation of New Jersey Application February 23, 1955, Serial No. 489,903

5 Claims. (Cl. 188—73)

This invention relates to rotor brake equipment, and specifically to a braking arrangement wherein controlled brake shoe wear is attained.

An object of this invention is to provide means for controlling brake wear so that maximum brake shoe service life may be attained.

Another object of the invention is to provide a device for obtaining maximum brake shoe life which will be extremely inexpensive, shall require no additional moving parts and shall require practically no maintenance.

Still another object is to provide a brake shoe wear adjuster which does not require the usual complicated system of guides or links, and which in no way can interfere with normal braking action.

Another object is to provide a brake shoe wear adjuster which eliminates the possibility of the brakes jamming in either their application or release.

Further objects of the invention will be apparent from the specification and from the drawings, wherein:

Figure 1 is a plan view of the novel brake arrangement, including a portion of the wheel and axle assembly;

Figure 2 is a fragmentary side view of the device shown in Figure 1;

Figure 3 is a fragmentary plan view, with portions cut away for clarity, showing the approximate position of a new brake shoe when ready for application;

Figure 4 is a view similar to Figure 3, but wherein the brake shoe has become partially worn; and Figure 5 is a view similar to Figure 3, showing the brake shoe in its terminal position.

In the past many attempts have been made and many devices developed for the purpose of equalizing brake shoe wear, and to utilize as much of the brake shoe as possible. These devices have certain inherent disadvantages which this invention eliminates. One of these devices employs a U-shaped guide to hold the brake shoe in parallel alignment with the rotor, but which occasionally failed in attempting to release the brake. Another device employs a parallelogram linkage which is also intended to guide the brake head and hold the brake shoe parallel to the rotor. This type of device is complicated, requires a number of related moving parts, and is therefore expensive to fabricate and maintain in operating condition. Certain other arrangements have been used, but each of them have the same general disadvantages as outlined above.

The present invention comprises a simple, novel means of accomplishing the desired result without the use of any complicated mechanism. In fact the only addition required to a standard rotor brake arrangement is the addition of at least one, or preferably two lugs, or abutments, which are welded or cast integrally with a portion of the mechanism. Thus the fabricating costs are extremely low and there is nothing which can get out of alignment or which would require any maintenance.

This invention operates on a different principle from those generally employed. No attempt is made to maintain the brake head in parallel alignment with the rotor, but rather the brake head is deliberately permitted to rotate out of parallelism with the rotor until a predetermined amount of random brake shoe wear has occurred, and is subsequently moved back into parallelism with the rotor so that maximum brake shoe life will result.

Referring to the drawings and specifically to Figure 1, a wheel and axle assembly 10 of conventional design is contemplated, consisting of an axle 11 and a wheel 12 rigidly fixed to the axle and rotatable therewith. A rotor 13 having friction surfaces 14 on opposed faces thereof is fixed to the axle, and is also rotatable therewith. The wheel and rotor are, of course, duplicated at the opposite end of the axle, but are not shown in the drawings. Adjacent the wheel and axle assembly a brake housing 15 is mounted in the usual manner. Extending from one end of the brake housing are brake levers 17, which extend to embrace the rotor 13 adjacent the friction surfaces 14. The brake levers are fulcrumed in the housing on the pins 18 and are actuated by the usual means (not shown) common in the art. A pair of brake head assemblies 19 are pivotally attached to the brake levers 17 by means of pivotal mountings 20. The brake head assembly consists of a pair of brake arms 21 mounted to either side of the brake lever 17, as best seen in Figure 2, and supports a brake head 22. Attached to each brake head, in the customary manner, is a brake shoe 24. A pair of abutments 26 and 27 are welded or cast to the brake lever 17.

The operation of the preferred embodiment of the device is best illustrated in Figures 3 to 5, inclusive. Figure 3 shows the brake arrangement when a new brake shoe is in use. The stop, or abutment, 26 is for the purpose of preventing any appreciable amount of counterclockwise rotation (as viewed in Figure 3) of the brake head assembly when the brake is in released position. In some embodiments of the invention this abutment may be eliminated. However, it would generally be employed as a safety feature. The second stop, or abutment, 27 is disposed on the opposite sides of the pivotal mounting 20 as compared to abutment 26. This abutment, of course, would prevent any appreciable clockwise rotation of the brake head assembly. In practice, however, at this stage the brake head assembly would not contact abutment 27.

The manner in which a particular brake shoe will wear due to engagement with the friction surface of the rotor cannot be accurately predicted. Generally the greater amount of brake shoe wear will take place toward its radially outermost edge due to the greater lineal speed of the rotor at its larger diameter. This, however, is not always the case. Brake shoe materials vary in certain of their physical qualities such as hardness and density, and the rotor itself may exhibit variances, for example, in the disposition of the lubricating element such as graphite. Under certain conditions, therefore, a nonrestrained brake shoe will wear uniformly across its entire face and thereby meain substantially parallel to the rotor. If this occurs, it is advantageous for the brake shoe to be able to align itself rather than to be restrained. The present invention permits this self-alignment in that the abutment 27 is normally spaced from the brake shoe head prior to wear and as long as uniform wear occurs.

If unequal wear takes place, the brake head assembly will gradually tend to move out of parallel alignment with the rotor until it approaches the position shown in Figure 4. At this time the brake head 22 contacts the abutment 27. Thereafter no additional clockwise rotation of the brake head assembly can occur. As additional brake applications are made the area of greater brake shoe pressure will move toward the right, or away from housing 15 as viewed in Figure 4. The reason for this is that, having contacted abutment 27, the brake head will no longer be self-aligning with the rotor but rather will be positionally restrained by the abutment. At this time the greater braking effort will occur in these higher pressure areas. Consequently the portion of the brake shoe which is toward the center of the rotor will tend to wear faster than the portion toward the outer diameter of the rotor until the entire head assembly reaches the position illustrated in Figure 5 of the drawings, wherein once again the head assembly is substantially parallel to the rotor and the brake shoe is worn equally across its entire surface.

It is readily seen that the above concept of compensating for unequal brake wear, or stated conversely, producing equal final brake wear across the entire face of the shoe, is different from any concept heretofore tried. The various other devices, as stated before, attempt to maintain the brake shoe at all times parallel to the rotor. This invention permits a deliberate change in angular relationship of the brake to the rotor followed by bringing the two back into alignment, and this is accomplished simply and effectively. Any person skilled in the art will recognize that certain modifications could be made in this device without departing from the spirit of the invention. For example, the lugs or projections could effectively be placed on the brake head and coact against the lever. However, the drawings show the preferred construction.

We claim:

1. In a rotor brake arrangement comprising a support, a pair of brake levers pivotally mounted on said support, a brake rotor having surfaces approximately radial to the rotational axis of said rotor, a brake head pivotally mounted on each of said levers, a brake shoe of uniform thickness mounted on each of said brake heads engageable with the related rotor surface, and spaced abutments provided on each lever, said abutments being disposed on opposite sides of the pivotal axis of the related brake head, one of said abutments being disposed intermediate the ends of the associated lever and adjacent the perimeter of the brake head remote from the rotational axis of the rotor, said one abutment engaging said brake head to prevent pivoting thereof in one direction away from the outer perimeter of the related rotor surface, the other of said abutments being secured to the free end of the related lever, said other abutment being noncompressible and spaced from the head, said other abutment being engageable with the head to limit pivotal movement of said head in the other direction as wear on the outer perimeter of the related shoe exceeds wear inwardly of said outer perimeter.

2. In a rotor brake arrangement, a support, a rotor having substantially radial friction surfaces, a pair of brake levers pivotally mounted on said support, a brake head pivotally mounted on each of said levers, a brake shoe of uniform thickness mounted on each brake head and being engageable with the related surface, and abutment means carried by each of said levers, said abutment means comprising stops spaced from each other along each of said levers, one of said stops being secured to the medial portion of the related lever, said one stop having a surface engaged with the related brake head, the other of said stops being noncompressible and secured to the free end of said lever, said other stop having a surface spaced from and engageable with the related brake head, said stop surfaces being flat and converging toward the related rotor surface to preclude simultaneous engagement of the stop surfaces with the related brake head, said one stop limiting pivotal movement of the brake head in a direction away from the outer perimeter of the rotor, said other stop limiting pivotal movement of the brake head in the other direction to produce substantially equal wear of the brake shoe.

3. In a brake arrangement comprising a rotor rotatable on an axis, said rotor having a friction surface arranged with its inner perimeter closer to said axis than the outer perimeter of said surface, a brake lever, actuating means connected to one end of said lever, a noncompressible abutment carried by the other end of said lever, a brake head pivotally connected to said lever along an axis normal to said rotational axis, said last-mentioned axis being disposed intermediate said actuating means and abutment and disposed adjacent the abutment, a brake shoe of uniform thickness carried by said brake head, said abutment having a vertical plane surface disposed substantially parallel to the longitudinal axis of the related lever, said abutment surface being spaced from the brake head, said surface engaging the brake head substantially centrally thereof subsequent to unequal wear of said brake shoe, to thereby equalize brake shoe wear.

4. A brake arrangement comprising a rotor rotatable on an axis and having an annular friction surface with an inner perimeter and an outer perimeter, the inner perimeter being closer to said axis than the outer perimeter, a brake support, a brake lever pivoted thereto on an axis approximately normal to said rotor axis, actuating means connected to said lever at one side of said second-mentioned axis, a brake head on the opposite side of said second-mentioned axis pivoted to the lever on an axis approximately parallel to the second-mentioned axis, a brake shoe mounted on said head and engageable with said surface, and a non-compressible abutment on said lever disposed farther from said second-mentioned axis than from the first-mentioned axis, said abutment being spaced from the head and being engageable with said head after a predetermined pivoting thereof with respect to said lever due to progressively greater wear on the shoe on the portion thereof farthest from the rotor axis than the portion of said shoe closest thereto.

5. A brake arrangement comprising a rotor rotatable on an axis and having an annular friction surface with radially inner and outer perimeters, said inner perimeter being closer to said axis than said outer perimeter, a brake actuator, a brake head pivoted to said actuator on an axis substantially normal to said rotational axis and defined by a plane substantially parallel to said rotational axis and disposed at one side thereof, said head having an inner surface facing said rotational surface and having an outer surface facing the actuator, friction means carried by the inner surface of said head, one side of said friction means being closer to said rotational axis than the other side of said friction means, whereby wear on said friction means tends to be progressively greater from said other side to said one side thereof, and rigid stop means on said actuator between said plane and a plane parallel thereto defining said rotational axis, said stop means being in alignment with said outer surface of said head and being spaced from said outer surface of a distance less than the maximum permissible distance of wear in the thickness of said friction means at said other side thereof.

References Cited in the file of this patent

UNITED STATES PATENTS

| | | |
|---|---|---|
| 1,649,597 | Karl | Nov. 15, 1927 |
| 2,348,078 | Ledwinka | May 2, 1944 |
| 2,413,614 | Eksergian | Dec. 31, 1946 |
| 2,441,680 | Wakefield | May 18, 1948 |
| 2,571,410 | Blomberg | Oct. 16, 1951 |
| 2,697,498 | Casey | Dec. 21, 1954 |